United States Patent
Friedrichs et al.

(10) Patent No.: US 10,437,997 B2
(45) Date of Patent: *Oct. 8, 2019

(54) METHOD AND APPARATUS FOR RETROACTIVELY DETECTING MALICIOUS OR OTHERWISE UNDESIRABLE SOFTWARE AS WELL AS CLEAN SOFTWARE THROUGH INTELLIGENT RESCANNING

(71) Applicant: Cisco Technology, Inc., San Jose, CA (US)

(72) Inventors: Oliver Friedrichs, Woodside, CA (US); Alfred Huger, Calgary (CA); Zulfikar Ramzan, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,610

(22) Filed: Jul. 13, 2017

(65) Prior Publication Data

US 2017/0308700 A1 Oct. 26, 2017

Related U.S. Application Data

(63) Continuation of application No. 14/971,168, filed on Dec. 16, 2015, now Pat. No. 9,747,445, which is a
(Continued)

(51) Int. Cl.
*G06F 21/56* (2013.01)
*G06F 16/13* (2019.01)
(Continued)

(52) U.S. Cl.
CPC .......... *G06F 21/565* (2013.01); *G06F 16/13* (2019.01); *G06F 16/2358* (2019.01);
(Continued)

(58) Field of Classification Search
CPC .................................................... G06F 21/525
(Continued)

(56) References Cited

U.S. PATENT DOCUMENTS

| | | | |
|---|---|---|---|
| 7,093,239 B1 * | 8/2006 | van der Made | G06F 21/562 714/38.13 |
| 7,266,843 B2 | 9/2007 | Tarbotton et al. | |

(Continued)

OTHER PUBLICATIONS

International Search Report and Written Opinion in counterpart International Application No. PCT/US/50530, dated Mar. 7, 2014, 24 pages.

*Primary Examiner* — Peter C Shaw
(74) *Attorney, Agent, or Firm* — Edell, Shapiro & Finnan, LLC

(57) ABSTRACT

Techniques are provided for the detection of malicious software (malware) on a general purpose computing device. A challenge in detecting malicious software is that files are typically scanned for the presence of malicious intent only once (and subsequent rescanning is typically performed in a simplistic manner). Existing methods in the art do not address how to most effectively rescan collections of files in a way that tries to optimize performance and efficacy. These methods may also be useful if additional information is now available regarding a file that might be useful to an end-user or an administrator, even though the file's core disposition might not have changed. More specifically, we describe methods, components, and systems that perform data analytics to intelligently rescan file collections for the purpose of retroactively identifying malware and retroactively identifying clean files.

20 Claims, 9 Drawing Sheets

Intelligent rescanning method in accordance with an embodiment of the present invention

Related U.S. Application Data continuation of application No. 13/942,360, filed on Jul. 15, 2013, now Pat. No. 9,245,120.

(60) Provisional application No. 61/671,402, filed on Jul. 13, 2012.

(51) Int. Cl.
*G06F 16/23* (2019.01)
*G06F 21/55* (2013.01)

(52) U.S. Cl.
CPC ............ *G06F 21/552* (2013.01); *G06F 21/56* (2013.01); *G06F 21/562* (2013.01); *G06F 21/564* (2013.01); *G06F 2221/033* (2013.01)

(58) Field of Classification Search
USPC .......................................................... 726/23
See application file for complete search history.

(56) References Cited

U.S. PATENT DOCUMENTS

| | | | |
|---|---|---|---|
| 7,594,272 B1* | 9/2009 | Kennedy | G06F 21/566 713/187 |
| 8,181,247 B1 | 5/2012 | Pavlyushchik et al. | |
| 8,402,544 B1* | 3/2013 | Soubramanien | G06F 21/564 713/150 |
| 8,832,835 B1* | 9/2014 | Chen | H04L 63/145 713/188 |
| 9,268,689 B1* | 2/2016 | Chen | G06F 12/0292 |
| 9,436,826 B2* | 9/2016 | Kapoor | H04L 63/145 |
| 2005/0064859 A1 | 3/2005 | Kotzin et al. | |
| 2006/0161988 A1 | 7/2006 | Costea et al. | |
| 2006/0174344 A1 | 8/2006 | Costea et al. | |
| 2006/0218637 A1* | 9/2006 | Thomas | G06F 21/51 726/23 |
| 2006/0294589 A1 | 12/2006 | Achanta et al. | |
| 2007/0079375 A1* | 4/2007 | Copley | G06F 21/566 726/22 |
| 2008/0115219 A1* | 5/2008 | Kim | G06F 21/563 726/25 |
| 2008/0229149 A1 | 9/2008 | Penton | |
| 2009/0328220 A1 | 12/2009 | Abdel-Aziz et al. | |
| 2010/0169972 A1 | 7/2010 | Kuo et al. | |
| 2010/0251365 A1* | 9/2010 | Lyne | G06F 21/55 726/22 |
| 2010/0293615 A1 | 11/2010 | Ye | |
| 2012/0066762 A1 | 3/2012 | Todorovic | |
| 2012/0084865 A1* | 4/2012 | Niemela | G06F 21/563 726/24 |
| 2012/0192276 A1* | 7/2012 | Andrews | G06F 21/564 726/24 |
| 2016/0098560 A1 | 4/2016 | Friedrichs et al. | |

* cited by examiner

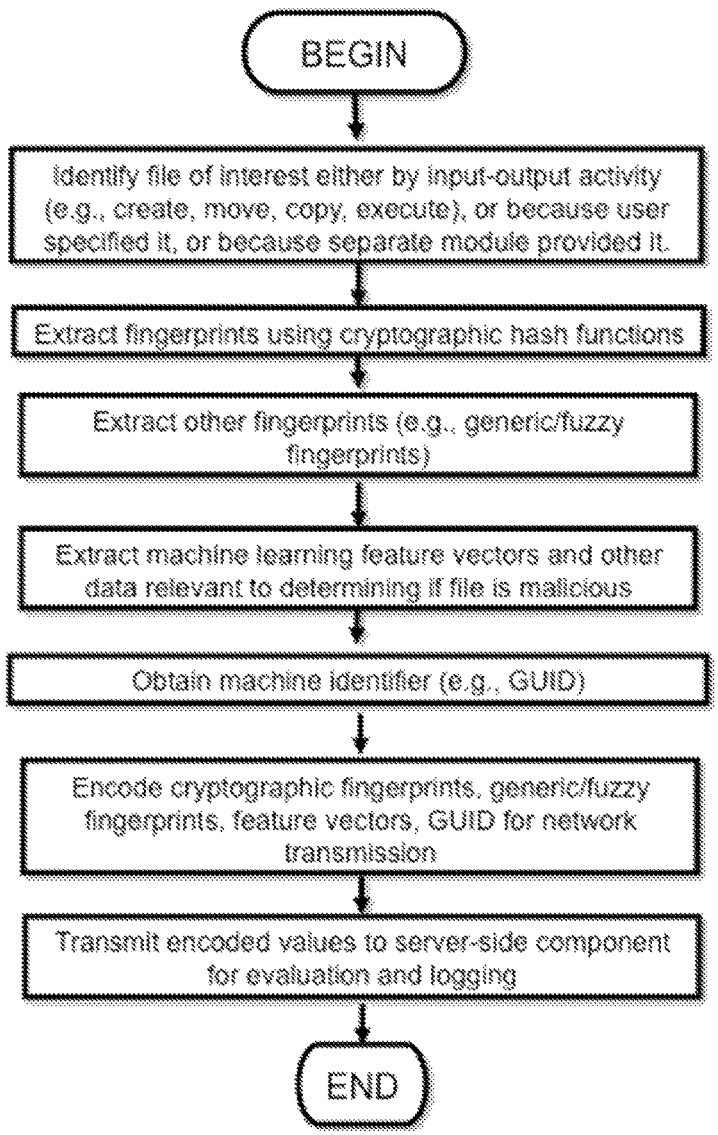
Figure 1 Flowchart of a meta-data extraction method in accordance with an embodiment of the present invention

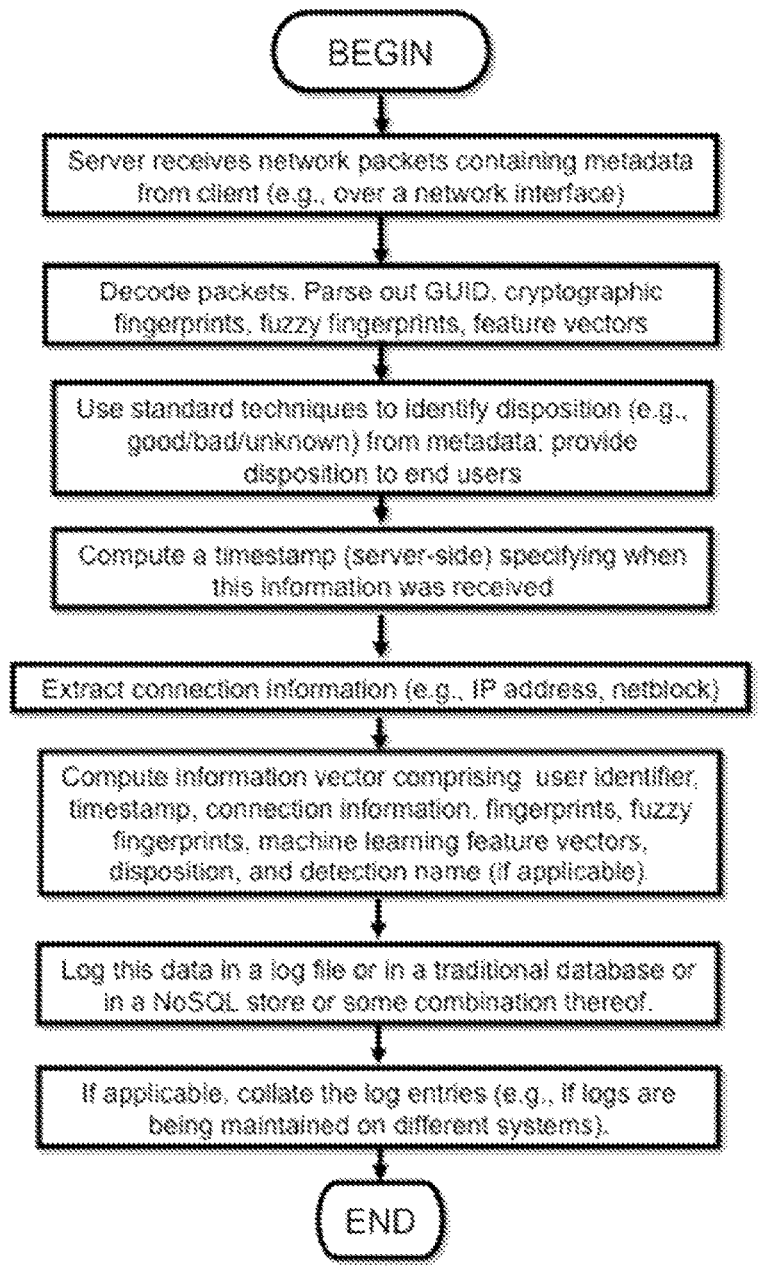
Figure 2: Log collection method in accordance with an embodiment of the present invention

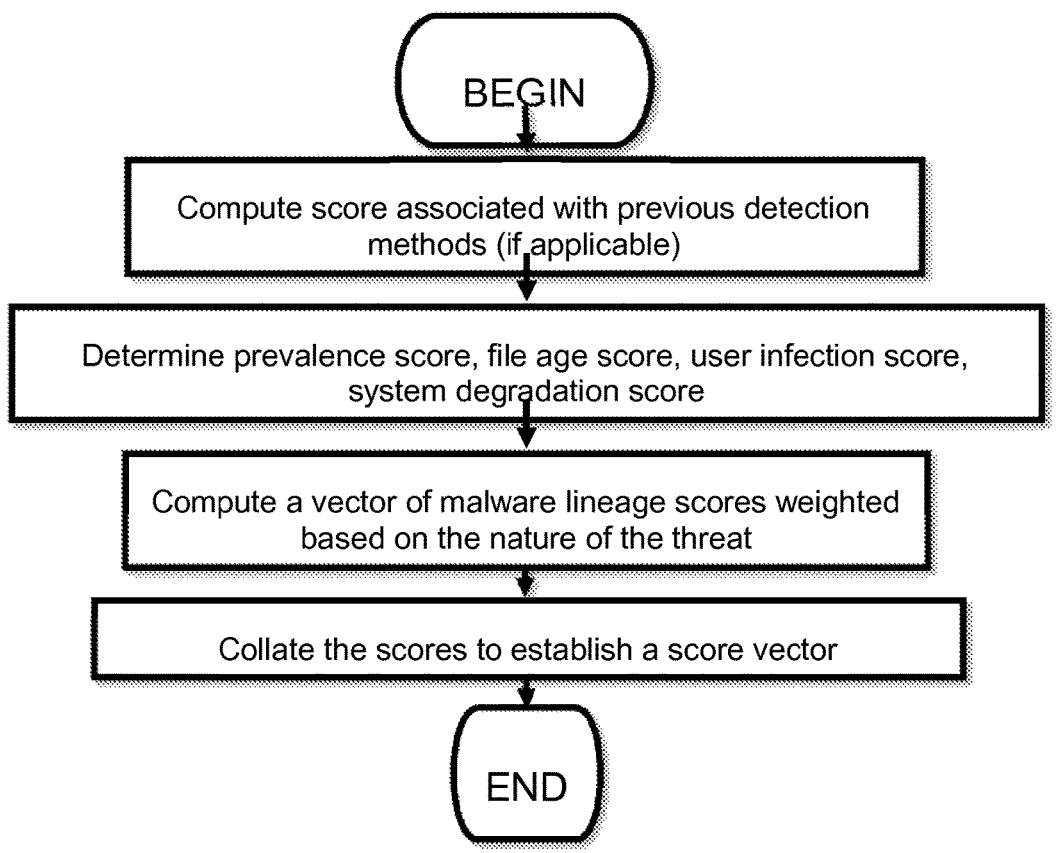
Figure 3: Intelligent filtering method in accordance with an embodiment of the present invention

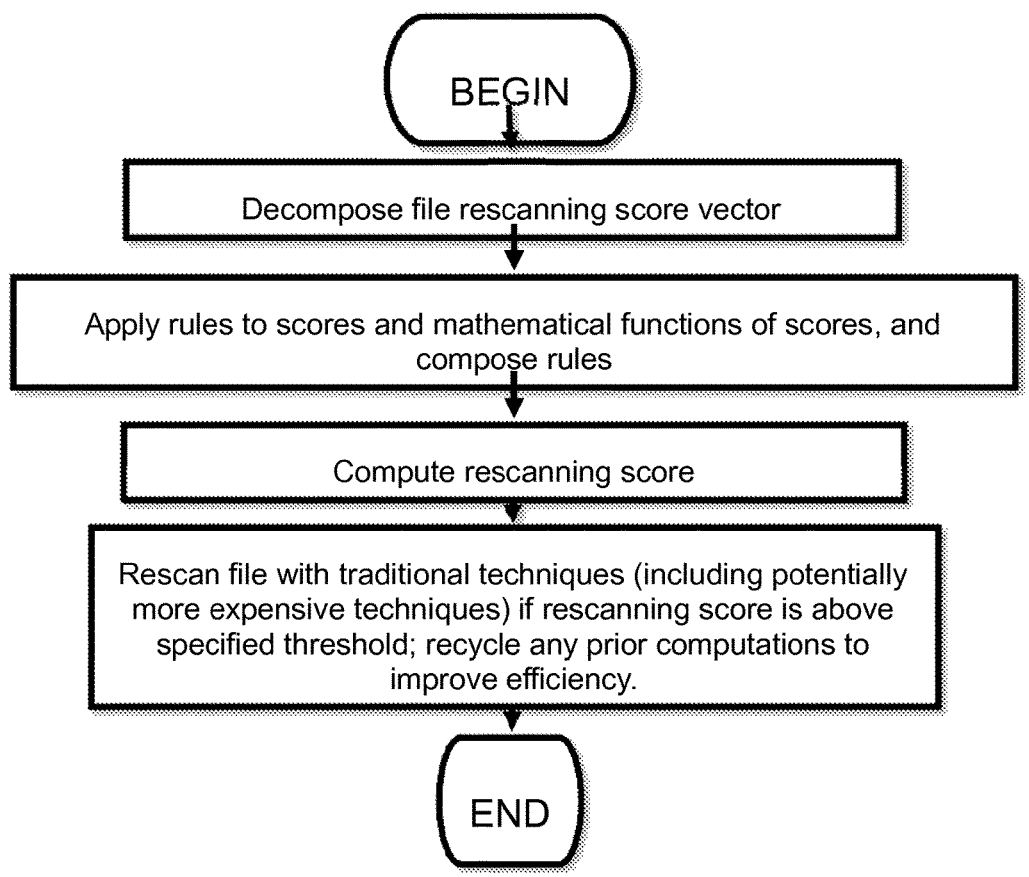
Figure 4: Intelligent rescanning method in accordance with an embodiment of the present invention

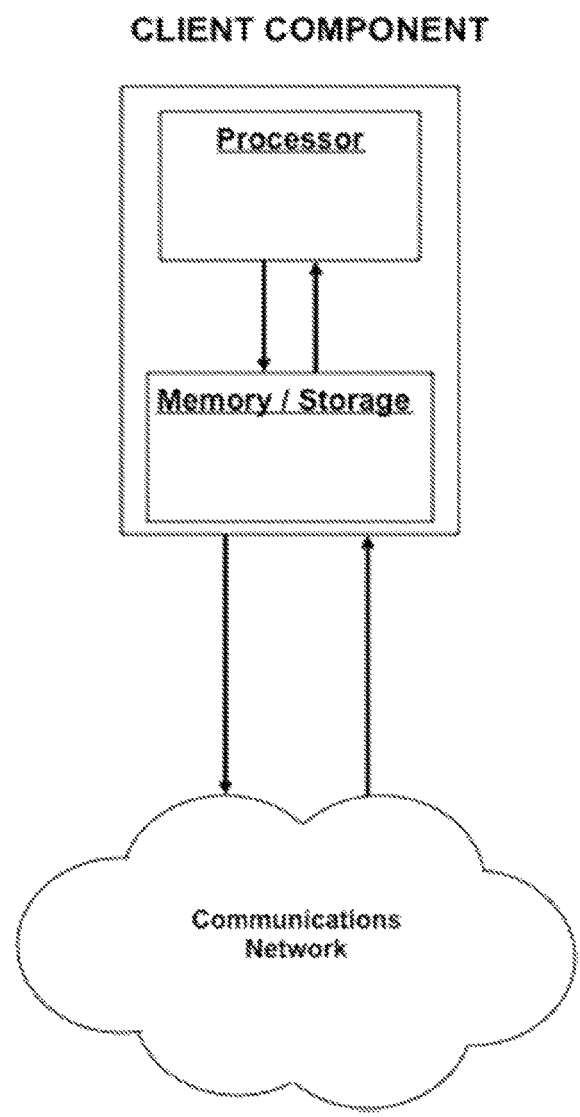
Figure 5: A client component in accordance with an embodiment of the present invention.

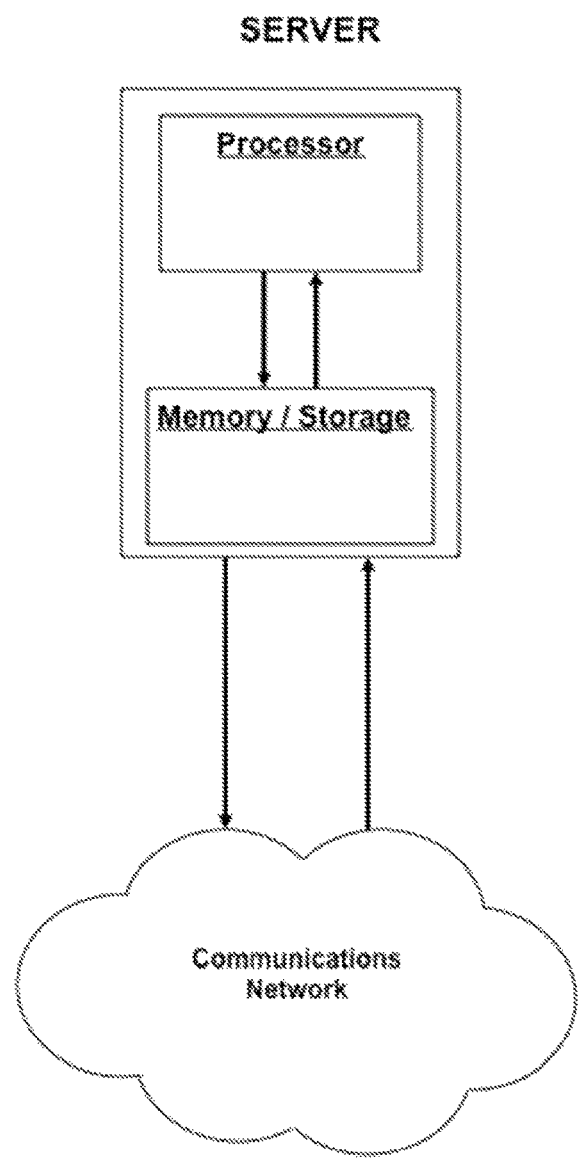
Figure 6: A server component in accordance with an embodiment of the present invention.

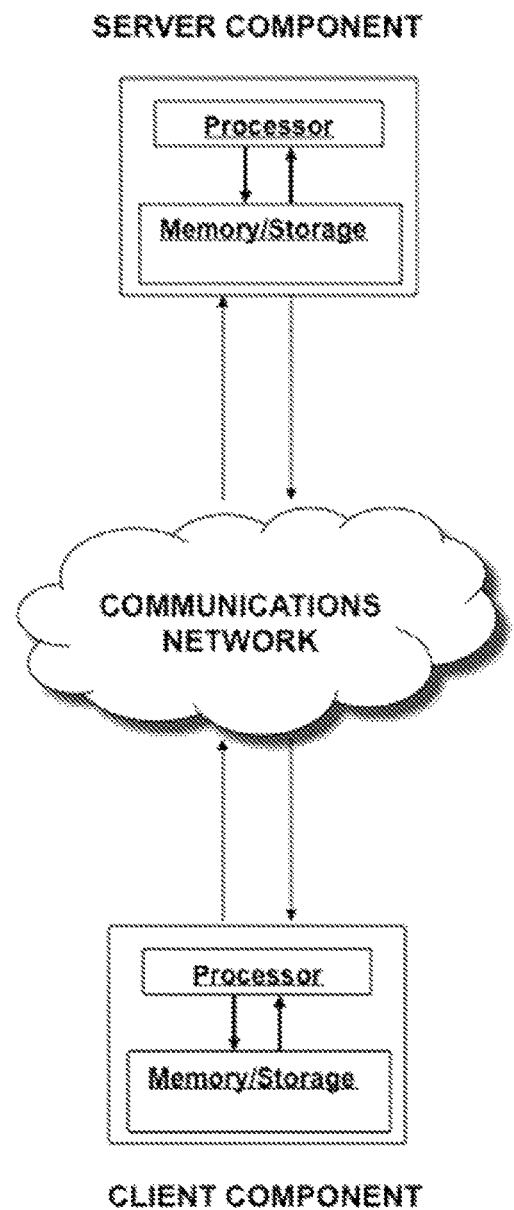
Figure 7: A system comprising client and server components in accordance with an embodiment of the present invention.

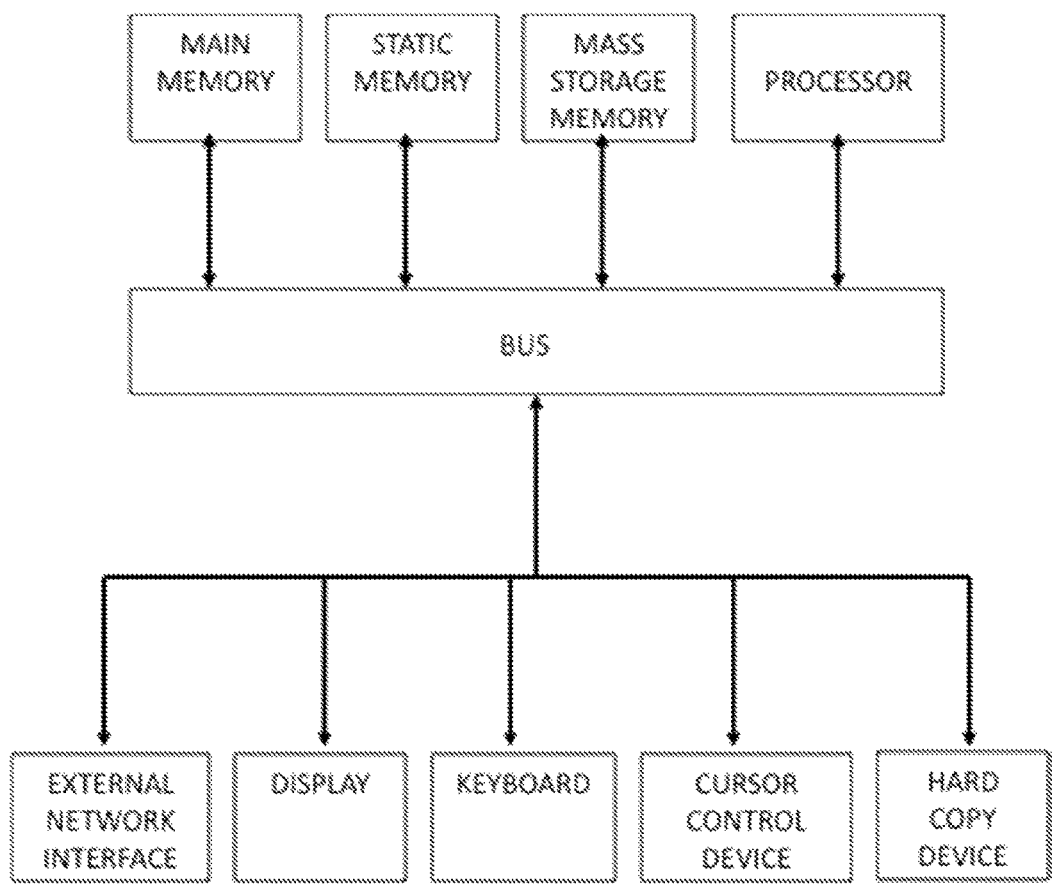
Figure 8: Exemplary computer system.

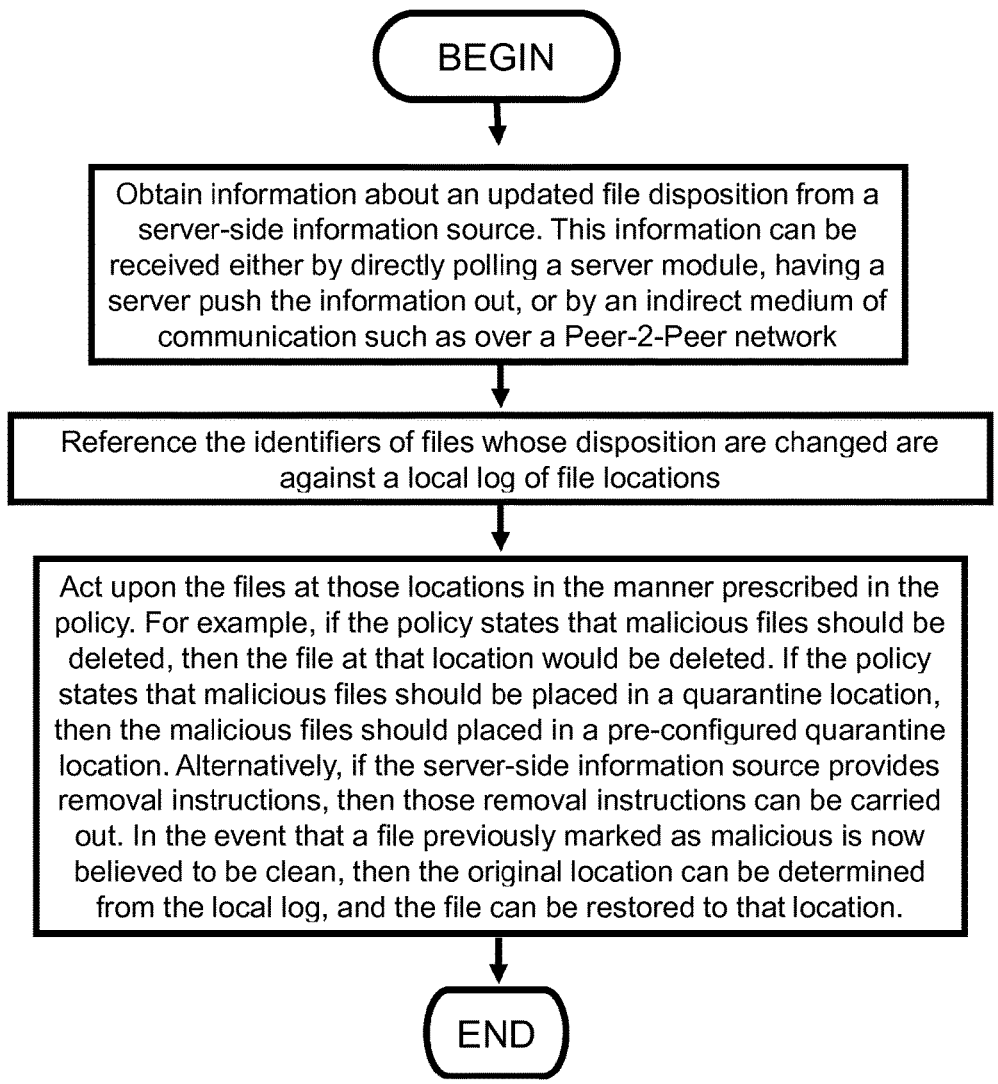
Figure 9 is a flowchart of an information filtering system for acting upon files in accordance with an embodiment of the present invention

METHOD AND APPARATUS FOR RETROACTIVELY DETECTING MALICIOUS OR OTHERWISE UNDESIRABLE SOFTWARE AS WELL AS CLEAN SOFTWARE THROUGH INTELLIGENT RESCANNING

CROSS-REFERENCE TO RELATED APPLICATIONS

This application is a continuation of U.S. patent application Ser. No. 14/971,168, filed Dec. 16, 2015, which in turn is a continuation of U.S. patent application Ser. No. 13/942,360, filed Jul. 15, 2013, now U.S. Pat. No. 9,245,120 B2, which also claims the benefit under 35 U.S.C. § 119(e) of U.S. Provisional Application No. 61/671,402, filed Jul. 13, 2012, entitled "METHOD AND APPARATUS FOR RETROACTIVELY DETECTING MALICIOUS OR OTHERWISE UNDESIRABLE SOFTWARE AS WELL AS CLEAN SOFTWARE THROUGH INTELLIGENT RESCANNING." The applications listed above are incorporated herein by reference in their entireties.

FIELD OF THE INVENTION

The present invention relates to the security of general purpose computing devices and more specifically to the detection of malicious software (malware) or any otherwise undesirable piece of software on a general purpose computing device through the use of intelligent rescanning of software collections and meta data.

BACKGROUND OF THE INVENTION

It is known in the art that each day, many tens of thousands of new malicious or otherwise undesirable software programs are discovered. These programs can compromise the security of general computing devices. Possible security violations include, but are not limited to, the theft of data from the system, the usurping of the system for other nefarious purpose (like sending spam email), and, in general, the remote control of the system for other malicious actions.

One popular technique in the art for detecting malicious software comprises the following steps:
  a. Establishing through some independent means that the application is malicious (e.g., by manually analyzing it). This step is typically carried out by a vendor of anti-malware technology.
  b. Constructing a signature for this piece of software. A signature comprises a set of characteristics that can be used to identify that piece of software (and pieces of software that are related to it). One example of a signature is a cryptographic hash or fingerprint. A hash is a mathematical transformation that takes the underlying binary contents of a software application and produces a relatively short string, with the idea being that two different applications will, with overwhelmingly high probability, have distinct fingerprint values. Common functions for performing this fingerprinting or hashing step include SHA-256, SHA-1, MD5, and others. A signature can also include a set of strings that are contained in the file in question.
  c. Publishing this signature so that it is accessible to end-users operating a general purpose computing device.
  d. Having the device cross reference the files it contains against the published signatures to determine if there is a match.
  e. Applying a set of steps or a given policy if the fingerprints match (e.g., blocking the installation of the application, removing it from the system if it is already installed, etc.).
  f. The above technique is geared towards situations when the signature was known ahead of time (i.e., before an actual piece of malicious or unwanted software arrived on an actual end-user system). In some cases, a piece of malware may have already infiltrated a system, and only subsequent to its infiltration will there be new evidence to suggest that the file was malicious.

Aside from that, an anti-malware vendor might initially deem a software application to be malicious, but later garner new intelligence to determine that the application was, in fact, clean (i.e., this determination was made in error and the particular application is actually benign). Even if a vendor has such new intelligence, it would need to cross reference that intelligence against all the files that it knows about to identify the files on which an error was made. Then there is no easy way for the vendor to retroactively undo its mistakes on end user systems without forcing users to scan their entire system for threats or clean files each time new intelligence on threats or clean files is discovered. Such an approach is prohibitively expensive, especially considering the large number of files on a given end-user system as well as the rate at which new intelligence can be gathered.

There is, accordingly, a need in the art to develop methods, components, and systems for intelligently rescanning the files a vendor knows about to identify if any of them are potentially malware (or can be determined to be conclusively clean). The naïve approach is to cross reference every file against every known signature. This approach is, however, expensive to carry out since a vendor might have a copious number of files and large amount of file data. Instead, one improved approach would be to identify a subset of files that were initially marked as non-malicious, but now appear to have a higher propensity of being malicious, thereby making them good candidates for re-examining Along these lines, analogous methods can be applied to files that were initially deemed malicious, but now appear to have a higher propensity of actually being benign.

SUMMARY OF THE INVENTION

In summarizing the invention, a system-level view is given, and then the components comprising that system as well as the methods to be executed on those components are described. It is to be understood that the in addition to the overall system, the invention being disclosed also comprises the individual underlying components used in the system as well as individual methods that would be executed on those components.

According to one aspect of the present invention, a system is provided that can be used to intelligently identify files that are likely to be malicious and hence are better candidates for rescanning. Using analogous approaches, such a system could be used to identify files that are likely to be non-malicious (even though they had previously been marked as malicious) and hence are good candidates for rescanning The system comprises a client and server component, which communicate. The client provides the server with information about files that are on it as well as what it knows about these files. The server tracks this information and periodically rescans a subset of these files against any new intelligence it gathers. If a discrepancy is found (i.e., a file that had been called malicious, but that is actually benign or a file that was previously called benign, but that is now believed to be malicious), the server informs the client, which in turn takes an appropriate action based on this information. For example, removing files that are now believed to be malicious and restoring files that were previously thought to be malicious, but are now believed to be benign. The server updates its database of known threats to incorporate this new information.

According to another aspect of this invention, a metadata extraction component is provided. Metadata can be extracted on a client system, a server system, or some combination of both. On a client system, the metadata extraction component can identify files of interest on the system (e.g., newly downloaded files) and extract relevant metadata from these files for the purposes of helping to determine their disposition and also subsequently rescan these files. The metadata can range from a few select features of the file all the way to the binary contents of the file itself. The metadata can also include contextual information from the system. The metadata, including possibly the whole file, is passed to a server-side component.

According to another aspect of the present invention, a server-side logging component receives data from a metadata extraction component and logs this information together with any additional transactional information such as a timestamp (computed by the server) for when this data was received. This server-side logging component should also receive a client identifier to help identify which system transmitted the metadata. In addition to logging the data, this component may attempt to make a direct determination about whether the file's disposition is believed to be good/benign or bad/malicious based on the current state of intelligence gathered about that file. Note that this component will effectively have a record of what software applications reside on what end user systems and more specifically, it will have relevant signature information about these applications.

According to another aspect of the present invention is a server-side intelligent filtering module. This module examines data from the log collection component and identifies a subset of files that are good candidates for re-examining.

According to another aspect of the present invention is a server-side rescanning module that re-examines files and file metadata from the intelligent filtering module, and updates an intelligence database accordingly. This module can also be used to identify endpoints on which a discrepancy exists and inform those endpoints about this discrepancy.

According to another aspect of the present invention, a method is provided for extracting meta data from a file and storing it in a way that allows for intelligent rescanning of the file. This method can be executed on a client (in which case the corresponding meta-data can be transmitted to a server), or can be executed on a server (in which case the file would be transmitted from a client to a server first), or some combination thereof (e.g., some pieces of meta-data can be collected on the client, and other pieces of metadata can be extracted on a server) The method is carried out by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for logging file meta data on a server and storing it in a way that facilitates intelligent rescanning. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for filtering a file collection to identify which files are good candidates for rescanning. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for rescanning a file and file meta-data repository for the purpose of identifying new pieces of malware as well as new clean files (along with the users who have those files). In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The subsequent description of the preferred embodiments of the present invention refers to the attached drawings, wherein:

FIG. 1 is a flowchart of a meta-data extraction method in accordance with an embodiment of the present invention.

FIG. 2 shows a log collection method in accordance with an embodiment of the present invention.

FIG. 3 is a flowchart of an intelligent filtering method in accordance with an embodiment of the present invention.

FIG. 4 is a flowchart of an intelligent rescanning method in accordance with an embodiment of the present invention.

FIG. 5 is a client component in accordance with an embodiment of the present invention.

FIG. 6 is a server component in accordance with an embodiment of the present invention.

FIG. 7 is a system comprising client and server components in accordance with an embodiment of the present invention.

FIG. 8 is an exemplary computer system.

FIG. 9 is a flowchart of an information filtering system for acting upon files in accordance with an embodiment of the present invention.

DETAILED DESCRIPTION OF THE INVENTION

In the following description, numerous details are set forth to provide a more thorough explanation of the present invention. It will be apparent, however, to one of ordinary skill in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The steps described herein are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, solid-state disk drives, read-only memories (ROMs), random access memories (RAMs), EPROMs, EEPROMs, magnetic or optical cards, or any type of media suitable for storing electronic instructions, and each coupled to a computer system bus.

The descriptions presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The description that follows will reference terminology that is generally known in the art. In the art, the term malware refers to a malicious software application. Such an application can have a number of nefarious purposes. For example, malware can be used to perform a number of malicious actions. These actions include, but are not limited to: stealing digital information from a victim's machine; using the victim's machine in the perpetration of other malicious activities (such as sending out unsolicited email messages or spam); remotely control the victim's machine; and inhibiting the machine from operating normally. In the art, a computer virus is generally considered one example of malicious software. In addition to computer viruses, other types of malware in the art include Trojans, Worms, Downloaders, and Misleading Applications (also known in the art as Scareware). In general, malware is considered to be an undesirable application from the perspective of the end user. The invention described herein can be applied to any form of undesirable software application and should not be limited to any one specific form of malware.

Anti-malware software attempts to assign a disposition to a given software applications. To do so, it typically engages in an operation called scanning. During this operation, the contents of a file are examined (and if applicable, other pieces of information are also examined, such as the behavioral attributes of that file). If an application is conclusively determined to be malicious (i.e., it corresponds to malware), then it is assigned a malign or bad disposition. In this case the application is either deleted outright from the system, though typically it is put in a special quarantine location so that it can be restored should there have been an error in calling it malicious.

Scanning can take place in two instances. To begin with, scanning happens on an endpoint device (i.e., the one that you are trying to protect with anti-malware technology). In addition, anti-malware technology vendors will scan files during the course of their back-office operations. In this case, they may use a different scanning technologies compared to what might be available on their customer endpoints. These back-office scanning technologies might be more sophisticated and potentially more computationally expensive to execute (which is why the vendor will only relegate these to use in their back office).

In addition to an initial scan, a file may be periodically rescanned if either its initial disposition was inconclusive, or the confidence associated with the disposition was below a certain threshold, or there is reason to believe that the initial disposition was incorrect, or even as a general safety mechanism to safeguard against the possibility that the initial disposition was incorrect, or to see if there is additional information available about that file that might be of interest to an end user or system administrator (e.g., a file may have been determined malicious through some generic means, but now more information is known such as the malicious software family it belongs to, or in what category of malware it can be placed, or what types of actions are associated with this type of malware). File rescanning typically involves cross referencing large file sample collections against the latest threat intelligence.

If an application is conclusively determined to be non-malicious by anti-malware software, then it is assigned a disposition of clean or good. In this case, the application is typically allowed to continue its execution on the system. For the case in which the scanning is done in the back office, the vendor will update its database of clean and malicious applications, such that when endpoints encounter these files, they will be handled accordingly.

If the anti-malware software is unable to conclusively determine whether an application is good or bad, then a disposition of unknown is assigned. The extent to which a determination must be conclusive depends on the particular situation. For example, in some scenarios, 95% certainty will be enough to make a determination. In other scenarios, 99% certainty might be required. Depending on the situation, an unknown application can be treated like either a good or bad application. For example, in highly security sensitive scenarios, it may make sense to delete or quarantine unknown applications. On the other hand, in less sensitive scenarios, unknown applications can be allowed to continue to stay on the system.

Anti-virus software is an example of anti-malware software that deals specifically with the removal of computer viruses, which are one form of malicious code. However, in the art the terms anti-malware and anti-virus have become conflated. For the purposes of the description provided in this disclosure, we will use these terms interchangeably.

In the art, the term false positive references a situation in which an otherwise legitimate application is accidentally deemed malicious (by a piece of anti-malware software). Similarly, a true positive references a situation in which a malicious application is correctly identified as such.

The false positive rate of a given anti-malware technology is a measure of the percentage of applications among a collection of clean applications that are (incorrectly) labeled malicious. The true positive rate of a given anti-malware technology is a measure of the percentage of applications among a collection of malicious applications that are (correctly) labeled malicious.

It is therefore the objective of anti-malware software to achieve a high true positive rate while having a low false positive rate among the set of applications with respect to the set of applications that reside on end user systems.

In practice, there is a trade-off between the true positive and false positive rates. Typically, a high true positive rate means that a given piece of anti-malware technology aggressively identifies files as malicious; in this case, there is an increased risk of incorrectly calling a legitimate application malicious as well, which in turn means that the false positive rate will also be high. Therefore, anti-malware technology aims to provide a favorable tradeoff between the true and false positive rates. For example, if one is able to achieve a large increase in true positive rate while only incurring a small increase in the false positive rate, then the tradeoff may be deemed favorable. Alternatively, if the cost of a false positive is very high, which is very possible given that blocking a legitimate application could translate into monetary business losses, then it may be desirable to take a more conservative stance that reduces it substantially even if that creates a corresponding substantial drop in detection rate. On the other hand, if the cost of a missed detection (or false negative) is very high, such as what might happen for a system that needs to be highly secured, then a high false positive rate might be tolerable so long as the risk of a threat infiltrating the system is made very small.

In the art, the term signature references a relatively short sequence of values that can be used to identify if an application is malicious or not. In its most general incarnation, the signature is computed as a transformation applied to an entire software application. In the art, a signature is typically computed (e.g., by an anti-malware technology vendor) on a known piece of malware. The signature is either transmitted onto a client's system or it is stored on a server. When a client encounters a new piece of software, it will determine if that software matches the signature either by checking its local data store or by querying a server. It is understood in the art that a signature can either be specific or generic. If two software applications have the same specific signature, then with overwhelming likelihood, these two applications are entirely identical. One example of a specific signature in the art is a SHA-256 hash. A generic signature permits that possibility that variations on a given application will continue to have the same signature. If an application is taken, and superficial changes are made to it, then the generic signature on this application might continue to be the same as the original whereas a specific signature on it will with extremely high likelihood be different from that computed on the original. One example of a generic signature in the art is the PEhash. Another example of a generic signature in the art is ssdeep.

In the art, the term fingerprint is often associated with a traditional signature and the term fuzzy fingerprint is often associated with a generic signature. In the art, the term conviction refers to a situation in which a piece of software is identified as malicious on a client system.

Aside from signatures that are computed from the entire binary contents of a file, a signature may also be computed on a certain portion of the file. For example, whether the file contains specific contents at specific locations. A signature can also comprise a fingerprint or the concatenation of a plurality of fingerprints taken from different sections of the files. This technique is used when specific portions of the file are more germane to determining whether that file is likely to be associated with known malicious software.

Another mechanism in the art by which a file can be determined to be malicious works as follows.

First, a set of features are extracted from a particular piece of software. These features can include both static characteristics that can be obtained from the actual binary contents of the file associated with the software, the static characteristics associated with application, and dynamic characteristics that can be determined by actually observing the execution of the software. Examples of static characteristics that can be gleaned directly from the binary contents of the file can include the size of the file, whether it is digitally signed, whether the file seems to contain structured data versus random looking data (with the latter being seen in malware instances where the authors try to obfuscate the operations to evade detection), the size of different sections of the file, and so on. Examples of static characteristics associated with the actual software application, but that cannot be gleaned directly from the static contents of the file, include the file's name, its path (i.e., in what directories and subdirectories it lies), what registry keys are associated with the file, and so on. Finally, dynamic characteristics might include whether the software application has attempted to access the network, whether it has pulled down additional software, whether it has tried to interfere with existing operating system processes, whether it has tried to overwrite any specific system files, and so on.

Second, from this set of features, a feature vector is formed. Third, the feature vector is evaluated. During this third phase, it is determined whether the features are indicative of the file being malicious versus benign. The actual methods for making this evaluation are orthogonal to the present invention, and are generally understood in the art. From the perspective of this invention, the most relevant piece of data is that a feature vector can be used to determine whether a particular application is malicious.

The following description will also make use of the concept of a log, which is known in the art. A log is a record of transactions and actions made on a given system. For example, if a system were a web server, then a log would comprise a description of the plurality of clients who connected to the system, the times they connected, and what actions they took. With a log, one can construct a reasonable synopsis of what happened on a given system. In the context of an Anti-Virus system, including one that uses a server component for assisting a client that desires a disposition for a given software application, a log entry could include, but not necessarily be limited to, the following: a client identifier that can be used to link disparate transactions from the same client, a timestamp specifying the time a client made a particular request for the disposition of a particular application, the location of the client (as specified by its Internet Protocol or IP address), a description of the file whose disposition is being requested (e.g., as encoded by a file fingerprint such an MD5 or a SHA-256), any Anti-Virus fingerprints associated with the application (including, but not limited to traditional fingerprints and generic fingerprints), attributes of the software application in question (including, but not limited to a machine learning feature vector of the attributes of the application of interest), contextual data about the application of interest that may aid in determining its disposition, the response of the server component (including, but not limited to the final assigned disposition of the application, a sub-disposition that provides additional description about the application such as that the application was previous unseen or is common in the field, the recommendation the server makes to the client about that application, and the dispositions assigned by different sub-technologies that were used in the process of coming up with a final disposition, and a caching time or time-to-live for the response that indicates how long the response might be valid for).

Since queries to a server can be complex and multi-faceted, the log entry can also include an entry that specifies a query type. For example, in one query to a server, a client might only include a basic fingerprint. In a subsequent query for the same file the client might include additional information. These two queries can be recorded separately with different query types (though when analyzing the logs, it might help to link the fact that the same client made two queries about the same file and for the purposes of additional data mining information from these two transactions can be aggregated and recorded together during a separate post-processing phase). A log would then comprise a plurality of log entries transmitted by a plurality of clients.

In the case of an anti-virus or anti-malware solution that uses a client-server architecture, there may be a plurality of servers to ensure high availability and improve overall reliability, especially in instances where there are too many end users to be serviced by just a single server. In this case, each server may maintain its own server logs. For the purpose of additional analysis of these logs, these logs may be concatenated or otherwise combined so that a single unified view of all transactions during a given time period can be obtained.

Log data can be optionally stratified or partitioned based on different criteria such as whether the users have natural groupings and sub-groupings that can include, but not be limited to, geographic groupings (i.e., the users are from similar locales) and affiliate groupings (that is, the users might be affiliated with each other—for example, they may all be members of the same enterprise or may have acquired the disclosed apparatus through a common source—such as a common download server or common distribution channel). This scenario is relevant in instances where anti-malware technology vendors have different distribution partners—such as Internet Service Providers or Original Equipment Manufacturers. Here we may wish to treat different logs differently. In these cases, analysis can be performed by concatenating or otherwise combining this plurality of logs.

According to one aspect of the present invention, a system is provided for intelligently rescanning files. The system includes a client and server component, which are capable of communicating with each other either directly or indirectly. The client extracts relevant meta-data from files of interest, such as a new file on the system, or a file that an end-user is specifically interested in scanning. The metadata comprises salient features of the appropriately encoded and may potentially include the entire file itself. The client provides the server with information about files that are on it as well as what it knows about these files. The client also provides the server with an identifier so that the server can subsequently determine which client contains which files. The server tracks this information, for example, by logging it. The server periodically scans these logs to identify files whose characteristics may be indicative of a disposition change. This subset of files is then targeted for rescanning. The server will cross reference these files against the latest intelligence it has or use more heavy-duty scanning technologies against these files. If a discrepancy is found (i.e., a file that had been called malicious, but that is actually benign or a file that was previously called benign, but that is now believed to be malicious), the server will update its database of know malicious applications and can inform the client (either directly or indirectly). The client, in turn can take an appropriate action based on this information.

According to another aspect of this invention, a client-side metadata extraction component is provided that can execute the following steps: First, it identifies Files of interest. In one embodiment, a file of interest is one written to the file system (or when any file is moved, copied, or any interesting file input-output behavior is encountered). On Microsoft Windows systems, this step can be accomplished through a Microsoft Windows Mini-Filter File System driver that traps File Input-Output behavior. Situations where files are being written to disk can be treated as noteworthy and those files can be examined in more detail. Alternatively, an end-user can demand a scan of a particular file (or of the entire contents of one or more storage locations, including, but not limited to, a hard drive, an external drive, a CD ROM, or a DVD ROM), for any reason. In this case, the corresponding files might be deemed of interest. Second, the meta-data extraction module extracts meta-data from this new file. This metadata can include one or more cryptographic hash values, one or more fuzzy hash values, one or more machine learning feature vectors, or some similar pieces of information that can be used in the art for identifying malware. The meta-data can also include behavioral characteristics and broader system characteristics (that can be encoded within machine learning feature vectors). This metadata as well as the actual software application associated with this metadata is recorded on the end user system. Third, this metadata, together with a user identifier, is transmitted to a separate (server) component. In extreme cases, the entire file can be transmitted to the server. In one aspect of the present invention, if the client is able to determine a disposition, then it can be sent to the server as part of the transaction. In another aspect of the present invention, the server can determine the disposition based on the data provided by the client. It should be noted that the first step (i.e., identifying a file of interest) can be carried out by a different component such as a separate file system mini-filter driver, and then this information can be passed to the metadata extraction module, which in turn can execute the remaining steps. The meta-data extraction component will also log the locations of files that are queried to the server. In this manner if a file is subsequently identified as malicious, it will be easy to locate that file.

It should be noted that in contrast to traditional anti-malware offerings, the primary purpose of the meta-data extraction component is not just to obtain a disposition immediately, but to collect data that can be used to determine whether a file is a good candidate for subsequent rescanning and to simplify the process of rescanning. For example, if scanning involves computing a plurality of fingerprints and then cross referencing those fingerprints against those computed on a corpus of files whose dispositions have been pre-determined, then the meta-data extraction component can compute this plurality of fingerprints so that they do not need to be subsequently computed when files will be cross referenced. In the process of extracting this meta-data, it may be possible to determine a conclusive disposition.

According to another aspect of the present invention, a logging component receives data from the meta-data extraction component and logs this information together with any additional transactional information such as a timestamp for when this data was received. As a result, this component will effectively have a record of what software applications reside on what end user systems. More specifically, the logging component will have relevant signature information about these applications. If the meta-data extraction component provides a disposition (good/bad/unknown)—e.g., one that is obtained by the computing device on which the component is executed, then this component can record this disposition along with the rest of the log data. Alternatively, if no disposition is provided, this component can reference any existing intelligence to determine whether the file's disposition is known and this information can be recorded. This component can optionally process this log information so that it can be more efficiently analyzed subsequently. In one aspect of the invention, the log data can be taken apart into its constituent components and stored in a SQL database, such as MySQL, Oracle, DB2, or SQL Server. In another aspect, the log data can be provided to a NoSQL technology, of which many are known in the art including, but not limited to, Cassandra, MongoDB, CouchDB, Riak, HBase, HIVE, Membase, Neo4j, and Redis. To effectively use such NoSQL technologies, it may be necessary to modify the format of the logs so that they can easily be processed by them. Possible ways to store log data include the Apache Log Format, Character-Delimited Separated Key-Value Pairs, JavaScript Object Notation (JSON), or Extensible Markup Language (XML).

According to another aspect of the present invention is an intelligent filtering component. This component examines metadata gathered on a plurality of files from a plurality of devices on which these files reside and identifies a subset of these files that are suitable candidates for rescanning. This component can use numerous characteristics for determining whether a file is suitable for rescanning. For example, if a file was detected as malicious on one or more systems, but the method for identifying the file as malicious was contextual—that is the method will identify the file on one system, but not necessarily on other systems (e.g., the method for identifying the file as malicious uses a behavioral characteristic of the application that might not be observed on other systems)—then the file should be rescanned to determine if it can be marked malicious in an unconditional manner that will apply to a larger set of systems. The characteristics used to determine whether a file is a suitable candidate can include, but are not limited to, the following.

First, whether the file or files were accessed shortly after one or more known malicious or known clean files were accessed. It is known in the art that malicious files are accessed in clusters and as such if files were accessed in proximity to known malicious files, then the likelihood that the file is malicious is correspondingly greater. A similar consideration applies for known clean files. In particular, if one or more files are accessed in proximity to a clean file on the system, then these files have a higher propensity for being benign and should be reexamined to see whether that can be confirmed. It should be apparent to one skilled in the art that the above logic can be augmented in numerous ways. For example, if a single system has experienced a spate of infections, then a broader set of files that are accessed in a broader time window can be reexamined. At the most extreme case, every file on the system can be reexamined if there is enough malicious activity emanating from that system.

A second consideration is whether the parent process that created a file is determined to be malicious. It is known in the art that malicious files often create other malicious files. Therefore, if a parent process is malicious, then the child process has a higher propensity of being malicious.

A third consideration is whether the file was detected as a threat on a system in a way that might have been specific to that system only. For example, some anti-malware technologies rely on monitoring actual execution behavior. If an application is behaving in a fashion that appears malicious, then its execution can be blocked and the application can be removed from the system. However, the same application might behave differently on different machines, and as such its behavior, while malicious, might not be to a sufficient degree to warrant removal. Therefore, if an application is seen to be malicious on one set of machines, then it should be reexamined to see if it should be removed on other machines. A similar consideration applies for detection technologies that do not always execute on a given system (either because of performance reasons, configuration reasons, or because a person is using a different version of the technology). In these cases, identifying something as malicious on system warrants a more careful reexamination to determine if the threat should be removed from other systems.

A fourth consideration is whether there is system-level behavior that is indicative of malicious software running on the system (even though a specific instance has not yet been conclusively been identified). For example, if the system starts to perform poorly (acts slow), then this consideration could trigger a re-examination of additional files on the system (e.g., any file that was introduced past a certain date or past the point where the system began acting poorly). Note that system behavior and performance metrics are one example of contextual meta-data that can be extracted and transmitted.

A fifth consideration is whether the file's prevalence among users exceeds a predefined threshold (for example, the file is on known to be on more than 50 systems). This information is useful in the context of identifying malware since it is known in the art that most malware has low prevalence (e.g., is either unique or is on a handful of systems). If a file was previously marked malicious, and now is seen to have high prevalence, then it is possible a mistake was made earlier and the file is now clean. More so, even if the file is still believed to be malicious, there may be additional intelligence regarding that file that is now available (such as the malware family it belongs to, the category of malware to which it can be classified, or the actions associated with this type of malware). Along similar lines, if a file was marked clean earlier, and its prevalence is higher, it is helpful to recheck whether it is still believed to be clean since we expect that as a file's prevalence increases, so too does the likelihood that there is useful intelligence regarding that file).

The intelligent filtering component can either reside on the same computing device as the meta-data extraction component or the logging component, or the intelligent filtering component can reside on a different device than either the meta-data extraction or logging components. If they reside on different devices, then it is assumed that there is a way for data from one component to be transmitted to another component, such as via a general purpose computer network. In this case, it is assumed that the data is appropriately encoded for transmission over this network.

According to another aspect of the present invention is a rescanning module that is provided a plurality of files for rescanning, and attempts to determine whether these files appear to be either malicious or benign to a certain degree of confidence. This module can use techniques known in the art for making this determination such as signature databases. The module can also use more heavy-duty deep scanning techniques—that might not be practical for use in general, but might be suitable for analyzing a smaller collection of files. For example, one technique known in the art for identifying malware involves executing an application and observing its behavior. For practical reasons, the amount of time that the application's behavior is observed is generally limited (perhaps to a minute or two). If dealing with an application that is being rescanned because it appears to have a higher propensity for being malicious, the time window can be increased (for example to several minutes or even to an amount that is proportional to the likelihood that the application is malicious on the basis of the characteristics observed during the intelligent filtering phase).

In another aspect of the present invention is a meta-data extraction method executed on the client system for collecting data for the purpose of facilitating a subsequent rescan of the file. Many of these steps are relevant to identifying whether an application is malicious or benign, and can be used for these purposes as well. The method comprises the following steps, each of which is optional. First, a file of interest is determined. This file can be determined on the basis of input-output activity on the underlying file system; for example a kernel driver can determine if a file is being written to the file system, or if there is a copy, move, or execution of a file. Alternatively, a file of interest can be directly specified by the user. Note that a separate module can provide information about a file of interest as well. Second, one or more cryptographic hash values are computed on the file. Standard cryptographic hash functions in the art include SHA-256, SHA-1, MD5, Tiger, HAVAL, and any of the SHA-3 candidates, among others. It is assumed that if these cryptographic hashes will be used for cross referencing the file against a known set of malware or cleanware, then the corpus of signatures for the known set will utilize one or more of these same cryptographic hash functions. Third, one or more fuzzy fingerprints are computed. Standard fuzzy fingerprints in the art include PE Hash and SSDeep. As before, it is assumed that if these fuzzy fingerprints will be used for cross referencing the file against a known set of malware or cleanware, then the corpus of fingerprints for the known set will utilize one or more of these same fuzzy fingerprint functions. Fourth a machine learning feature vector is computed. This vector comprises any features that are relevant to determining whether a particular file might be malicious. The vector can comprise both static features taken from the binary contents of the file, non-binary static features (such as the file name), dynamic features (such as characteristics about the actual behavior, network traffic, and so on), and other contextual features such as applications associated with the file in question (e.g., the application that created the file or any subsequent applications created when the file in question executed) as well as any broader characteristics of the system in question around the time the file features were computed (such as the system's performance characteristics, CPU usage, memory usage, and so on). Fifth, a machine identifier is determined. This identifier can be a standard operating system GUID (Globally Unique Identifier) or be a unique value established during registration. The main requirement is that the value is unique to a particular client and that the same client uses the same value during its transactions (though if multiple users use the same machine, then either a unique GUID can be sent for each user or more preferably, there is a way to distinguish different users, but still tie them to the same physical system). Note that in the art, permitting statistically unique identifiers is sufficient for all practical purposes. For example, the identifier can be a randomly chosen number from a very large range of possible values. With such an approach it is theoretically possible that two users will be assigned the same randomly chosen value, but if the range of possibilities is large enough, then the likelihood of two users being assigned the same value will be negligibly small. In this case, the identifier will, with overwhelming likelihood, be unique. Sixth, the fingerprints, the feature vectors, and the identifier are encoded into an appropriate format and transmitted to the logging module. If the logging module resides on a separate computing device, then the data would need to be encoded for transmission over a communications network. There are many possibilities known in the art for encoding data over a transmission network (these include hexadecimal encoding, BASE 64 encoding, etc.). The resulting encoded data can then be provided to the logging module.

Note that the steps in the above method can largely be carried out in any order once the file has been identified, though the data values can only be encoded once they are determined. If a value could not be determined within a reasonable period of time, then a symbol indicating it as undetermined, such as "?", can be used in the encoding. Note also that data can be encoded as it is computed rather than all at once after the fact.

In another aspect of the invention is a method for logging file meta-data (typically on a server though also on a client as well) in a way that can facilitate rescanning. The method comprises the following steps. First, the file meta-data is provided as input to the meta-data logging method. If the method is being executed on a different computing system than the one on which the meta-data was computed, then the meta-data logging method would receive one or more data packets over a communications network via a network interface. Second, the meta-data is decoded and stored within a structure for retrieving the constituent components of the metadata. The structure should contain some subset of the following fields: (1) A client identifier (and possibly a user identifier for a specific user who used a system); (2) One or more fingerprints associated with a file; (3) One or more fuzzy fingerprints associated with the file; (4) One or more machine learning feature vectors associated with the file. Third, a disposition is determined based on the information provided (the disposition can be determined through a separate module or through any technique known in the art, including, but not limited to: checking whitelists/blacklists for the presence of fingerprints or fuzzy fingerprints; applying a machine learning classifier to the feature vectors; using any characteristics of the system on which the file recently came, such as its recent infection history; or using any aggregate information gathered about the file such as its patterns across a plurality of users and its prevalence). The disposition can be good, bad, or unknown. Note that from the perspective of a client system, in some instances an unknown file might be allowed to continue remaining on the system (i.e., it will be treated in a manner similar to that of a good file), whereas in other instances (such as a system that contains sensitive data or is in a sensitive location, an unknown can be blocked (i.e., treated in a manner similar to that of a malicious file). Further, the disposition can include a confidence value (or both the disposition and the confidence value can be encoded in a single number; for example, a number between 0 and 1 where 0 means good and 1 means bad, and numbers closer to one are more likely to be bad, in which case 0.85 would mean an approximately 85% chance the file is malicious). In the event of a bad disposition, a detection name can be computed if appropriate. Fourth, a server-side timestamp is computed. Fifth, relevant connection characteristics are determined; these characteristics can include, but are not limited to, the Internet Protocol (or IP) address of the system and the netblock associated with the system. Sixth, an information vector comprising the following entries is computed: user identifier, timestamp, connection information, fingerprints, fuzzy fingerprints, machine learning feature vectors, disposition, detection name (if applicable), and detection method (if applicable). In the context of rescanning the file, the detection method would be of use in determining whether the detection relies on specific contextual information about a given system versus being unconditional. (A file that was subject to a contextual detection, for example, is a good candidate for rescanning since it might be determined to be unconditionally malicious, and blocked on all systems in which it encountered—not just those systems that triggered contextual criteria). Seventh, additional ancillary data can be computed from the meta-data; e.g., the overall prevalence of the file, the frequency with which the file was seen during given time window, the number of malicious files associated with a given user (both overall and within a specific window), etc. Note that this information can also be computed after the fact as well, though it may be more convenient to compute it in an ongoing fashion so that it is more readily accessible later. Eighth, this entry can be logged either in a log file or in a traditional database or in a NoSQL store or some combination thereof. Ninth, the log entries can be separately collated (e.g., if logs are being maintained on different systems).

In another aspect of the present invention is a method for intelligently filtering files for the purpose of subsequently rescanning them. The method analyzes meta-data on files (and the users who have had those files)—e.g., as seen from the output of meta-data extraction component. The output of this method is a vector of scores that capture the propensity of the file to be a good candidate for re-scanning. The method comprises the following steps, each of which are optional. First, for each file, if it was previously considered malicious (on any system), then information on how the file was detected can be gathered; on the basis of this information, a score can be assigned to the file to capture its propensity for being malicious. Second, the prevalence of each file can be determined. Third, for each user, an infection score can be assigned (on the basis of how many malicious files that users has possessed) and in turn, for each file an "infected user" score can be assigned on the basis of the number of threat detections that users who have that file have had. Fourth, for file, a "system degradation" score can be assigned on the basis of how negatively that file affected system performance after it was found on the system. Fifth, a "malware lineage score" can be assigned on the basis of whether that file was actually the child of a piece of (known) malware or whether it was the parent of a piece of known malware. Note that we can have a vector of lineage scores depending on how one file is the parent of another (e.g., whether the parent-child relationship involves a file "create", "execute", "move", or "copy")—with the idea that some activities provide a stronger tie of maliciousness (e.g., a file that "executes" a piece of known malware might have a higher propensity of being malicious compared to a file that simply "moved" a piece of known malware). Note also that this score can be weighted depending on the frequency of such activity on a system. For example, imagine that files A and B were each seen to create copies of files C and D respectively among a set of users. Imagine further that file A created 5 copies of file B on a single system, but file C created just one copy of file D. If files C and D were later determined to be malicious, then (all else being equal), file A has a higher propensity for being malicious (since malicious software often tries to create multiple copies of itself on a system to render it more difficult for anti-malware technology to remove all traces). The score can also be weighted based on the nature of the threat. For example, some threats are known to be more pernicious and are also known to have capabilities of downloading other threats onto a system. In this case, the score can be adjusted accordingly (e.g., a file created by a threat that is known to create threats on a system, then that file has a higher propensity of being malicious). The vector of scores attempts to capture whether the file is a good candidate for rescanning. Sixth, a file age score can be computed that captures how old the file is (with the idea being that once a file exceeds a certain age, it becomes less interesting to rescan).

Note that for any score in the score vector that is associated with a file being malicious, an analogous score can be constructed in association with the file being clean; e.g., in additional to a malware lineage score, one can construct a "clean-ware lineage score" on the basis of whether the file is a child or parent of known or believed clean files.

According to another aspect of the invention is a method for rescanning files. The method takes as input a vector of scores that capture propensity of the file to be a good candidate for rescanning. The scores in the vector can include, but are not necessarily limited to, the following: (1) What previous scanning technology said about the file (e.g., whether the file was previously considered malicious); (2) The prevalence of the file either as determined from the community of users who are running a specific piece of client software or through third-party intelligence (note that for these purposes, knowing the exact prevalence is not strictly necessary—for example, it may be sufficient to know whether the file was never seen before, whether it was seen but only on a small number of machines, or whether it was seen on a large number of machine); (3) An infection score computed on the basis of the number of infections seen by users who have been known to possess this file; (4) A "system degradation" score computed on the basis of how negatively that file affected system performance after it was found on the system; (5) A vector of "malware lineage scores" computed on the basis of whether that file was actually the child of a piece of (known) malware or whether it was the parent of a piece of known malware—with scores computed depending on the nature of the parent-child relationship (e.g., file create, file copy, file move, file execute; (6) A vector of "clean-file lineage scores" computed on the basis of whether that file was actually the child process of a file that is believed (or known) to be clean—with scores computed depending on the nature of the parent-child relationship (e.g., file create, file copy, file move, file execute). The rescanning method also utilizes a rules engine. This engine specifies how the vector of scores that have been input can be combined and utilized to arrive at a final score for determining whether the file is a candidate for rescanning. The rules engine can use one or more of the following techniques (as well as combination of these techniques), though it should be understood that the following are meant for illustrative purposes and should not limit the scope of how the rules engine can be implemented: (1) Rules can be defined according to a set of "if-then" statements concerning the different scores (e.g., if the file is a child of known malware then set the rescan score to 1; if the child is a parent of known malware then set the rescan score to 1; if the file is a parent of 10 known cleanware files and 0 known malware files, and the file has been seen in the community for more than 10 days, then set the rescan score to 0.1); (2) Rules can be defined according to a set of "if-then" statements concerning different combinations of mathematical functions of the different scores (e.g., if the user infection score divided by the square root of the prevalence score is above 0.5, then set the rescan score to 0.9); (3) Rules can be defined according to direct mathematical functions of combinations of mathematical functions of the different scores (e.g., set the rescan score to be the sigmoid function of the infection score divided by the square root of the prevalence score—so, if we let t=the infection score divided by the square root of the prevalence score, then the rescan score would be $(1/(1+e^{(-t)}))$, where e is the base of the natural logarithm, and can be approximated by 2.718281828459045235); (4) Rules can be defined according to the output of one or more machine learning algorithms for generating models (e.g., Support Vector Machines, Decision Trees, Random Forests, Artificial Neural Networks, Multi-layer perceptrons, Logistic Regression, Bayesian Networks, etc.); (5) Rules can be defined by combining, composing, or collating one or more of the above rules formats (e.g., if the score produced by the Neural Network multiplied by the natural logarithm of the score produced by the Support Vector Machine exceed 0.7, then set the rescan score to 0.9). Once the rescan score is determined, it can be compared to a threshold to determine if the file should be rescanned. The threshold can either be globally applied for all files, or it could be tailored for individual users/systems and groups of users/systems (e.g., for systems holding highly critical data, a lower threshold could be used to trigger a rescan). Along similar lines, the rescan threshold can vary based on other factors, such as timing (e.g., in the weeks leading up to an announcement of financial results or any other major announcement for that matter, the threshold can be set lower to reduce the likelihood that sensitive data leaks). Once a decision is made to rescan a file, the process for rescanning it can include known techniques in the art, including, but not limited to: (1) determining whether the file matches one or more fingerprints of known malware (or clean-ware); (2) Executing the file in a sandboxed environment and determining if its actual execution behavior is indicative of it being malicious or being clean; (3) Emulating the execution of the file (i.e., not actually executing it, but looking at the individual instructions to see what would happen were it executed) to determine if its behavior is indicative of it being malicious or being clean; (4) Identifying if there are any patterns inside the file (e.g., signatures, or other heuristic indicators) that point to it either being malicious or clean; (5) Determining if the file is digitally signed and if the corresponding digital certificate is indicative of the file being clean—e.g., digitally signed files associated with certificates that were issued by well-known authorities to well-known companies will, with very high likelihood, be benign (similarly, if a piece of malware has been digitally signed, then future instances of digitally signed files associated with the same certificate should be viewed with suspicion). After the file is rescanned and a disposition is obtained, then the new disposition can be made available in general (i.e., any corresponding signature or file databases can be updated). Moreover, if the original meta-data collected for the file includes information about users who have actually had the file, then client software components on those systems can be informed about the new disposition.

Note that if the rescanning is happening directly on the client endpoint, then it can simply act on a new disposition according to a pre-specified policy. For example, one or more files determined to be conclusively malicious upon rescan can either be blocked from executing, deleted, or moved into a special quarantine area.

FIG. 6 is a block diagram of an exemplary computer system that may perform one or more of the operations described herein. Referring to FIG. 6, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc. The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (CD), coupled to the bus for displaying information to a computer user. An alphanumeric input device, including alphanumeric and other keys, may also be coupled to the bus for communicating information and command selections to the processor. An additional user input device is cursor control, such as a mouse, trackball, trackpad, stylus, or cursor direction keys, coupled to the bus for communicating direction information and command selections to the processor, and for controlling cursor movement on the display. Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

Example 1

This example illustrates a specific instance of the invention, describing the steps and actions along the way. This example is provided to help clarify the description, and it should not be considered limiting in any way. For example, the above invention description covers many variations and extensions. To avoid obscuring the example, these variations and extensions are not discussed below.

To begin, consider a piece of agent software running on a user's machine. According to this example, the agent software contains a Microsoft Windows' (kernel-level) filesystem mini-filter driver that can detect when an executable file is being written to the file system. Other software that can detect when an executable file is being written to the file system can also be used.

Following notification that there has been or is an attempt to write a file to the file system, the software agent can track and log information about the file on the system, such as its location in the file system, whether or not that file has created other files, and so on. This information will be helpful if the file deemed to be malicious and subsequently needs to be removed.

In addition, the agent computes several values. First, it computes "traditional" fingerprints, such as a SHA-256, on the file. In addition, it can compute a machine learning feature vector from the file. The feature vector will comprise a number of attributes associated with the file on this system, including, but not limited to: which DLLs are referenced by the application, the values of specific positions of the binary contents, the number of sections in the file (and any attributes associated with those sections—such as whether it is readable, writeable, or executable), the number of symbols, the size of the binary, whether the binary is digitally signed, etc. All of these attributes are easily computed from the binary contents of the file. In addition, other contextual pieces of information are included in the feature vector, including, but not limited to, the file system timestamp, properties of the filename (note that the same file may have different names on different systems, so this attribute is specific to an instance of the file on a given system), information about other software applications installed on the system (e.g., whether the system has any vulnerable software or software that commonly leads to a system infection, etc.), and recent infection history of the system (e.g., such as whether the user experienced any infections in the last half an hour). These attributes are being encoded appropriately, and compressed as well (for compact transmission).

The client then sends these values to a server (note, however, that the notion of a separate server is a convenient abstraction and represents just one way of practicing the invention; the actual logic that a server might execute can also be executed directly on the client). In addition to these values, the client should send an identifier (to help identify the client in question should the item be deemed malicious subsequently). The client can log any information that is sent to the server so that this information can be subsequently cross referenced if necessary.

The server, in turn, first looks up the file in any blacklists and whitelists (using, for example, the traditional fingerprints to perform this look-up). If this look-up results in a conclusive disposition (e.g., the file is conclusively known to be malicious or benign), then this disposition is communicated to the client. If this check is inconclusive, the server can evaluate the machine learning feature vectors to see if the file can be conclusively determined to be either malicious or clean. In either case, the server can provide the client with a response and log the details of the transaction, including, but not limited to, a timestamp specifying when the transaction took place, a client identifier (which is a string that can help uniquely identify the client), the various fingerprints used, and an encoding of the final disposition associated with the file at the time of the transaction (i.e., good/bad/unknown).

Note that in these cases, the server can rely solely on the meta-data provided by the client (and so does not need to possess a copy of the actual full binary contents of the file, although many of meta-data features that the client extracts could also, in principle, be extracted on the server if it is provided with a binary copy of the file).

The metadata and any additional computations performed by the server can be saved and used subsequently to facilitate rescanning the file. For example, any fingerprints that were computed can be saved so that they do not need to be recomputed. Similarly any machine learning features that were computed on the server side in the process of evaluation can also be retained for future use.

The agent software on the client, upon receiving a disposition from the server, can act according to a specified policy that describes what actions to take on a given disposition. If a file is determined to be conclusively malicious, it can be moved from its present location into a special quarantine area. If a file is determined to be conclusively clean, it can be marked as such. Finally, if a file has an unknown disposition, the agent can determine what to do according to the policy. Possibilities include treating an unknown as if it were benign (i.e., not doing anything) or treating an unknown as if it were malicious (i.e., quarantining). Additional possibilities include doing further processing on an unknown file. In either case, the details of the transaction can be logged and cached for future purposes.

Periodically, the server can perform the intelligent file filtering to determine which files are suitable for rescan. For example, the server can flag the following files as candidates for rescanning: (1) Any file that was detected through a detection capability that is either contextual or that is not otherwise available across all machines under its purview; (2) Any file with a previously unknown disposition coming from a system that has had more than a particular threshold of detection events during a defined window of time (e.g., more than 20 detections during a one-day period); (3) Any file marked as malicious, but whose prevalence is above a certain threshold (e.g., 50 users); (4) Any "unknown" file whose prevalence is above a certain threshold (e.g., 100 users); (5) Any previously unknown or clean file that is either a parent or child of a malicious file; (6) Any previously unknown or malicious file that is either a parent or child of a clean file; (7) Any file whose generic fingerprint is associated with malware or that contains a generic signature associated with malware, but where the actual specific file instance itself was not otherwise previously known to be malicious (i.e., a specific or non-generic 1-1 fingerprint of the file is not on any known blacklists); (8) Any file whose generic fingerprint is associated with clean-ware or that contains a generic signature associated with clean-ware, but where the actual specific file instance itself was not otherwise previously known to be clean (i.e., a specific or non-generic 1-1 fingerprint of the file is not on any known whitelists); (9) The file's age (as determined by server-side timestamps of when the file was initially encountered) does not exceed a certain threshold (that can also be determined partly on the basis of how frequently filtering and rescanning is performed); e.g., 1 month. After this threshold, it is unlikely that further analysis of the file will yield any new insights and as such, the file can be disregarded in the future (though primarily if performance is an issue). To the extent that performance is less of an issue, the age threshold can be increased.

The server can then rescan those files meeting one or more of the above criteria. The server can apply one or more of the following steps for rescanning the file. The server can first determine whether the file matches one or more full fingerprints or fuzzy/generic fingerprints of known malware (or cleanware); in addition, the server can scan for the presence of other known malware or cleanware signatures. Since the files are being rescanned and have a higher propensity for having a conclusive disposition, they can be checked against a bigger set of blacklists, whitelists, and signature sets than you might typically do for an initial scan. Note also that since an initial scan was performed on the file already, any results from that initial scan can be recycled to avoid duplicate computation. For example, if a file was already searched for the presence of a particular signature, it need not be rechecked for the same signature. Second, any machine learning feature vectors associated with the file can be evaluated (these include features that specific to the file, such as its size, as well as features computed using community data, such as the file's prevalence) against a set of classifiers. Again, since the file in question has a higher propensity for having a more conclusive disposition, the scanning process can use potentially more computationally expensive machine learning classifiers than one might normally use for an initial scan. Also, as in the previous case, any computation performed in the initial scan can be recycled for the rescan. For example, some community features can be reused or augmented (e.g., to compute prevalence, one only needs to know the original prevalence and add to that any new instances of the file seen among a given setoff users). Third, the file can be executed in a sandboxed environment and determine one can determine if its actual execution behavior is indicative of it being malicious or being clean (note that a machine learning approach can be used here as well—with the behavioral attributes used as elements of the feature vector). As before, since the file in question has a higher propensity for having a more conclusive disposition, one can execute the file for a longer period of time in the sandbox and/or use more expensive machine learning models than one might use for an initial scan. Fourth, if the file was digitally signed and if the signature is valid (which is likely something that was already determined as part of the initial scan), then the corresponding digital certificate can be cross referenced against lists of known good and bad certificates.

After the file is rescanned and a disposition is obtained, then the new disposition can be made available in general (i.e., any corresponding signature or file databases can be updated). Moreover, if the original meta-data collected for the file includes information about users who have actually had the file, then client software components on those systems can be informed about the new disposition.

During this process, the user identifiers associated with discrepancies (i.e., files that were unknown or malicious that are now believed to be good as well as files that were unknown or good that are now believed to be malicious) can be recorded together with an identifier for the file as well as the updated disposition. This information can be placed in a location where it is accessible to legitimate agent software on an end user system. To enhance security, the information can be encrypted so that only a legitimate agent can access it (e.g., using either a symmetric key known only to the agent, a public key for which the agent knows the corresponding private key, or a broadcast encryption scheme so that only the subset of agents who have files that have new dispositions can decrypt the contents). The contents can also be protected using an authentication scheme as well. There are numerous techniques in the art for protecting this type of content from unauthorized access and the choice is orthogonal to the implementation of the rest of the system as well as the practice of the remainder of the invention.

Periodically, the agent software running on an end-user system will query the server to see if its identifier is recorded among those for which a discrepancy has been noted. (This can happen by having the agent provide its identifier to the server, and having the server check this identifier against its logs; alternatively, the server can provide a list of identifiers to the agent and have the agent check whether the identified is included on the list.) If needed, the agent can authenticate itself to prove to the server that it is authorized to access this information.

If the agent's identifier is listed among those for which there is a discrepancy, then the agent can be provided with the file associated with the discrepancy as well as the updated disposition of file.

Based on the file's new disposition, the agent can carry out steps given in a pre-defined policy. For example, if a file that was previously thought to be either good or unknown is now believed to be malicious, then the agent can remove that file. To do so, it may need to reference the identifier provided by the server with its own local logs to see where the file is located on the file system of the client computer on which the agent is running. In the art, a file is typically moved into a special quarantine area on the file system so that it can be restored in the event that a mistake was made.

If instead, the file in question was previously thought to be malicious, but is now believed to be good, then the agent can restore the file to its original location. To do so requires that the file was never completely deleted in the first place.

In the art, rather than deleting a file, it can be put into a quarantine area from where it can be restored if needed.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

What is claimed is:

1. A method comprising:
   at a server in a system that includes a plurality of clients or one or more applications, receiving meta-data extracted from files of interest from the plurality of clients or associated with the one or more applications, wherein the files of interest have been identified based upon an activity, including creation, movement, copying, or execution, and wherein the meta-data includes contextual information of how each of the files of interest was identified;
   logging the meta-data into log files;
   periodically scanning the log files to identify a subset of the files of interest as one or more candidate files for rescanning according to a vector of scores generated based on: (1) a determination that the meta-data indicates that a file was accessed after one or more known malicious or known clean files were accessed, and (2) a determination that the meta-data indicates that a process that created the file is malicious or benign; and
   rescanning the one or more identified candidate files against information stored at the server to determine whether a previously assigned disposition for the one or more identified candidate files needs to be changed.

2. The method of claim 1, further comprising:
   communicating with a client or an application when at least one of the following is determined upon rescanning a particular file: (1) that the particular file had been previously assigned a malicious, benign or unknown disposition and should be assigned a different disposition; and (2) that there is additional information about a particular file that had been previously assigned a malicious, benign or unknown disposition; and
   updating a database of information pertaining to known malicious and benign applications.

3. The method of claim 2, wherein the additional information includes updated information about what the particular file does, when executed, on different systems.

4. The method of claim 1, further comprising determining an immediate disposition of a particular file based on the meta-data prior to identifying the particular file as one of the one or more candidate files.

5. The method of claim 1, further comprising:
   logging transactional information relating to the meta-data; and
   maintaining a record of software applications and end user devices on which the software applications reside.

6. The method of claim 1, further comprising examining the meta-data in the log files from a plurality of devices to identify the subset of the files of interest as the one or more candidate files for rescanning.

7. The method of claim 6, wherein the identifying is further based on information indicating whether the file was detected as a threat on a particular device in a way that might have been specific to the particular device.

8. The method of claim 1, wherein the vector of scores is also generated based on one or more of: a determination that the meta-data indicates that a prevalence of the file among multiple users exceeds a pre-defined threshold and a determination that a system-level behavior of a system associated with the file is indicative of malicious software running in the system.

9. An apparatus comprising:
   a memory containing computer readable instructions; and
   a processor configured to execute the computer readable instructions to:
   receive meta-data extracted from files of interest from a plurality of client computers or one or more applications, wherein the files of interest are files of the plurality of client computers or associated with the one or more applications which have been identified based upon an activity, including creation, movement, copying, or execution, and wherein the meta-data includes contextual information of how each of the files of interest was identified;
   log the meta-data into log files;
   periodically scan the log files to identify a subset of the files of interest as one or more candidate files for rescanning according to a vector of scores generated based on: (1) a determination that the meta-data indicates that a file was accessed after one or more known malicious or known clean files were accessed, and (2) a determination that the meta-data indicates that a process that created the file is malicious or benign; and
   rescan the one or more identified candidate files against stored information to determine whether a previously assigned disposition for the one or more identified candidate files need to be changed.

10. The apparatus of claim 9, wherein the processor is further configured to execute the computer readable instructions to:
    communicate with a client computer or an application when at least one of the following is determined upon rescanning a particular file: (1) that the particular file had been previously assigned a malicious, benign or unknown disposition and should be assigned a different disposition; and (2) that there is additional information about the particular file that had been previously assigned a malicious, benign or unknown disposition; and
    update a database of information pertaining to known malicious and benign applications, wherein the additional information comprises updated information about what the particular file does, when executed, on different systems.

11. The apparatus of claim 9, wherein the processor is configured to use the meta-data to determine an immediate disposition of a particular file prior to identifying the particular file as one of the one or more candidate files.

12. The apparatus of claim 9, wherein the processor is further configured to execute the computer readable instructions to:
    log transactional information relating to the meta-data; and
    maintain a record of software applications and end user devices on which the software applications reside.

13. The apparatus of claim 9, wherein the processor is further configured to execute the computer readable instructions to:
    examine the meta-data in the log files from a plurality of devices to identify the subset of the files of interest as the one or more candidate files for rescanning.

14. The apparatus of claim 13, wherein the identifying is further based on information indicating whether the file was detected as a threat on a particular device in a way that might have been specific to that particular device.

15. A non-transitory computer-readable storage media encoded with software comprising computer executable instructions and when the software is executed operable to:
   receive meta-data extracted from files of interest from a plurality of client computers or one or more applications, wherein the files of interest are files of the plurality of client computers or associated with the one or more applications which have been identified based upon an activity, including creation, movement, copying, or execution, and wherein the meta-data includes contextual information of how each of the files of interest was identified;
   log the meta-data into log files;
   periodically scan the log files to identify a subset of the files of interest as one or more candidate files for rescanning according to a vector of scores generated based on: (1) a determination that the meta-data indicates that a file was accessed after one or more known malicious or known clean files were accessed, and (2) a determination that the meta-data indicates that a process that created the file is malicious or benign; and
   rescan the one or more identified candidate files against stored information to determine whether a previously assigned disposition for the one or more identified candidate files needs to be changed.

16. The non-transitory computer-readable storage media of claim 15, wherein the computer executable instructions are further operable to:
   communicate with a client computer or application when at least one of the following is determined upon rescanning a file: (1) that a particular file had been previously assigned a malicious, benign or unknown disposition and should be assigned a different disposition; and (2) that there is additional information about the particular file that had been previously assigned a malicious, benign or unknown disposition, and
   update a database of information pertaining to known malicious and benign applications, wherein the additional information comprises updated information about what the particular file does, when executed, on different systems.

17. The non-transitory computer-readable storage media of claim 15, wherein the meta-data is used to determine an immediate disposition of a particular file prior to identifying the particular file as one of the one or more candidate files.

18. The non-transitory computer-readable storage media of claim 15, wherein the computer executable instructions are further operable to:
   log transactional information relating to the meta-data; and
   maintain a record of software applications and end user devices on which the software applications reside.

19. The non-transitory computer-readable storage media of claim 15, wherein the computer executable instructions are further operable to:
   examine the meta-data in the log files from a plurality of devices to identify the subset of the files of interest as the one or more candidate files for rescanning.

20. The non-transitory computer-readable storage media of claim 19, wherein the identifying is further based on information indicating whether the file was detected as a threat on a particular device in a way that might have been specific to that particular device.

* * * * *